UNITED STATES PATENT OFFICE.

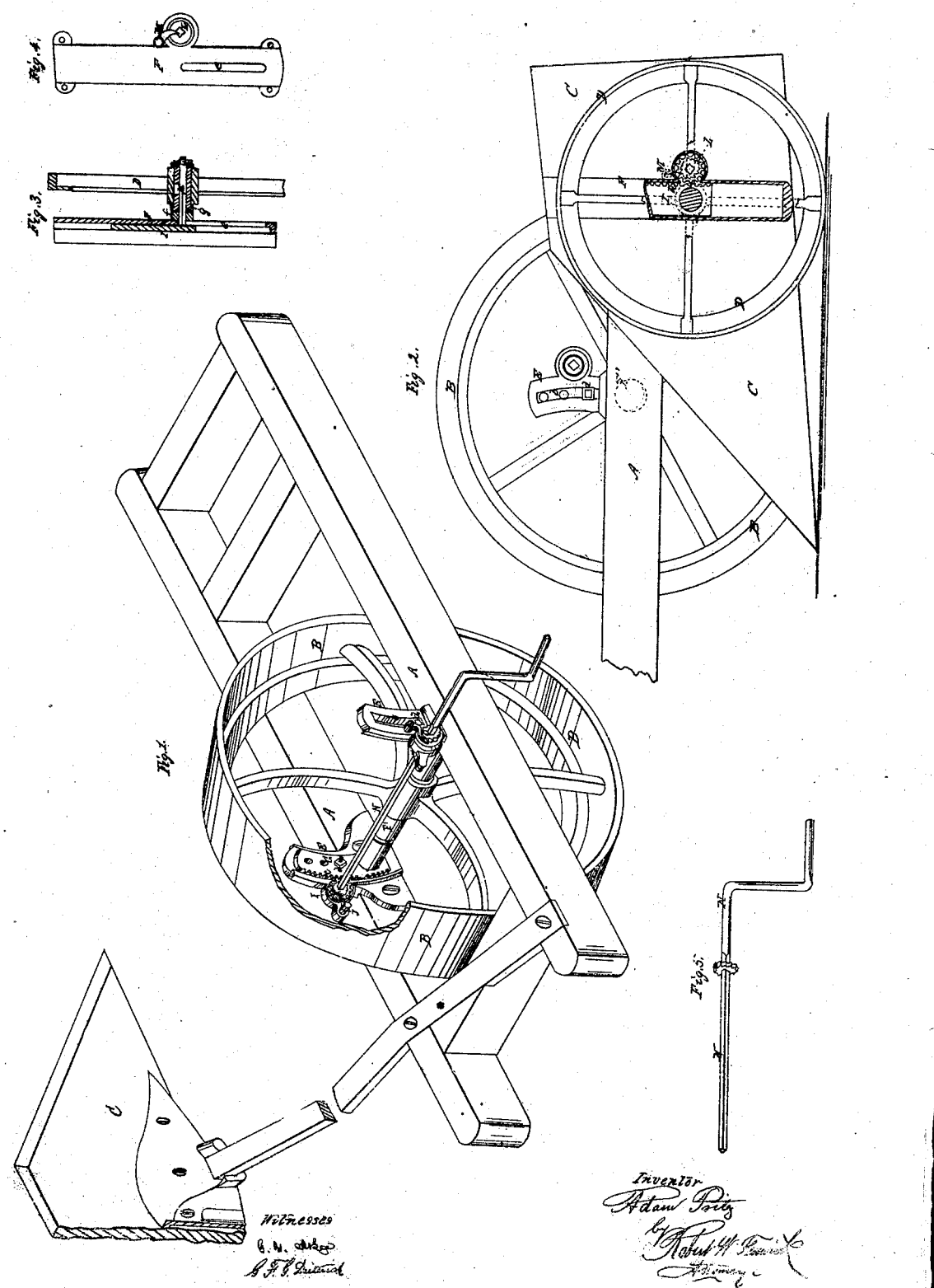

ADAM PRITZ, OF DAYTON, OHIO.

IMPROVEMENT IN HARVESTERS.

Specification forming part of Letters Patent No. 32,080, dated April 16, 1861.

*To all whom it may concern:*

Be it known that I, ADAM PRITZ, of Dayton, in the county of Montgomery and State of Ohio, have invented a new and useful Improvement in Harvesters; and I do hereby declare that the following is a full, clear, and exact description of the same, reference being had to the accompanying drawings, forming a part of this specification, in which—

Figure 1 is a perspective view of a portion a harvester with my improvements applied to it. Fig. 2 is a view, looking from the grain side of the machine. A portion of the grain-wheel and its bearing-box is broken out. Fig. 3 is a vertical transverse section through the axle of the grain-wheel and its bearing-box. Fig. 4 is an elevation of the grain-wheel axle-box and its retaining-pawl. Fig. 5 is a perspective view of the detachable crank-key and its attached ratchet-wheel.

Similar letters of reference in each of the several figures indicate corresponding parts.

My improvements are designed to facilitate the operation of raising and lowering the cutting apparatus, &c., from the stubble and grain sides of the harvester; and the nature of the same consists, first, in the employment of a detachable crank-shaped key, in combination with two adjustable curved toothed bearings, two curved slotted guide-boxes, two revolving pinions, one or more ratchet-wheels, one or more stop-pawls, the harvester-frame, and the master or driving wheel, substantially in the manner hereinafter described.

It consists, second, in providing a ratchet-wheel on the detachable crank-shaped key, and a pawl on one of the slotted guide-boxes of the master-wheel and on the guide-box of the grain-wheel, so that the one key may be used for raising both the stubble and the grain side of the machine, and while being thus used will act as a stop to retain the harvester in the position it may have been adjusted during the time that the retaining-pawls are being thrown into gear with the ratchets of the pinions, and while the grain side of the harvester is being firmly locked in the position to which it has been adjusted.

To enable others skilled in the art to make and use my invention, I will proceed to describe its construction and operation.

A represents that part of the frame which is supported by the master or driving wheel B, and C that part which is supported by the grain-wheel D.

E E are guide-boxes projecting up from the side timbers of the part A of the frame, and F a guide-box bolted firmly to the outer side of the part C of the frame. The boxes E E are made of curved shape and have a curved slot, *b*, cut through them, as represented, said slot being concentric with the inner curved edges of the boxes.

F' is the axle of the master or driving wheel, and G G curved bearings attached to its ends and projecting upward therefrom some distance. These bearings have cog-teeth *c* cut on their rear or convex edge, and are fitted snugly in the boxes E E, being confined therein by means of screw-bolts, which are passed through the curved slots *b* and have nuts *d* screwed on their outer ends.

H H are cog-pinions, made with square holes through their center, set in the boxes just in rear of the curved bearings, so as to work in gear with the cog-teeth *d* of the bearings.

I is a ratchet-wheel attached fast to the face of one of the cog-pinions, and J is a pawl hung on one of the guide-boxes, so as to catch into the teeth of the ratchet. There may be a ratchet and pawl applied to the other pinion and guide-box, if found necessary.

The parts thus constructed and arranged serve for connecting the part A of the frame to the master or driving wheel, as represented, and also allow of any desired adjustment of said part of the frame being made, as will be presently described.

K is the axle of the grain-wheel. It has a screw-thread cut on its outer end and a toothed bearing-plate, I², attached to its inner end. The bearing-plate fits snugly in the guide-box F, and the axle passes through an oblong slot, *e*, cut through the box, as represented. On the axle a washer, *f*, and sleeve *g* are fitted, and on the sleeve the grain-wheel hub is placed so as to revolve. Now, by screwing a nut on the end of the axle the sleeve is forced toward the box F and the axle drawn in a reverse direction, and consequently the bearing-plate caused to bind so firmly against the box that the part C of the frame is prevented from descending.

L is a cog-pinion, also made with a square hole through its center, and set in the box E, just in rear of the bearing-plate, so as to work in gear with the cog-teeth $h$ on said plate, as represented.

M is a pawl hung to the box F just above and nearly in line with the axis of the pinion L.

N is a detachable crank-shaped key, and O is a ratchet arranged on the same. By passing this key through the holes in the centers of the cog-pinions H H and between the arms of the master or driving wheel, and throwing back the pawls J J', the part A of the frame can be raised to any desired height by simply turning the key. After the adjustment has been made, the pawl J, being thrown in gear with the ratchet, will prevent the part A of the frame from again descending. Again, by having the ratchet on the key and bringing said ratchet in gear with pawl J', there is no danger of the pawl descending during the time that the operator may cease turning the key, for the pawl and ratchet will serve to retain the frame in whatever position it may have been adjusted. After the full adjustment has been made and the pawls thrown in proper positions, the key must be withdrawn, in order that it shall not be in the way of the arms of the wheeel during their revolution. The same key may now be used for adjusting the grain side C of the frame, to effect which all that has to be done is to slacken the nut on the end of the axle of the grain-wheel and pass the key through the square hole of the pinion L until its ratchet comes directly under the pawl, and then turn the key. It will be noticed here that the pawl M, by falling into the teeth of the ratchet, will prevent the frame descending at such times as the operator may cease turning the key.

I am aware that the frames of harvesters have been adjusted by cog-wheels; but I am not aware that two bearings have been raised at one time and equally by means of a detachable key such as I show; nor am I aware that the adjustment has been maintained by means of ratchets and pawls attached to the pinions, as I show; nor am I aware that the combined detachable key and ratchet has ever been used for adjusting both master and grain wheel.

I am also aware that a stationary shaft with two pinions and a ratchet-wheel has been combined with the platform of a harvester for the purpose of elevating both ends of the platform at one and the same time, and therefore I do not claim such an arrangement.

I am also aware that the master-wheel has been hung in a secondary frame which rises and falls squarely by means of curved guideways and a thrust-screw. Therefore I do not claim such an arrangement; but

What I claim as my invention, and desire to secure by Letters Patent, is—

1. The employment of a detachable crank-shaped key N, in combination with two adjustable curved toothed bearings, G G, two curved slotted guide-boxes, E E, two revolving pinions, H H, one or more ratchet-wheels, I, one or more stop-pawls, J, the harvester-frame A, and the master or driving wheel B, substantially as and for the purpose set forth.

2. Providing the detachable crank-shaped key N with a ratchet-wheel, O, to operate in combination with the pawl M on one of the slotted guide boxes E of the master-wheel B, and on the guide-box F of the grain-wheel D, substantially as and for the purpose set forth.

ADAM PRITZ.

Witnesses:
GEO. M. YOUNG,
H. B. CHANDLER.